(12) United States Patent
Bucher et al.

(10) Patent No.: US 9,267,094 B2
(45) Date of Patent: *Feb. 23, 2016

(54) DRAG REDUCING COMPOSITIONS AND METHODS OF MANUFACTURE AND USE

(71) Applicant: Flowchem, Ltd., Waller, TX (US)

(72) Inventors: Brad Bucher, Houston, TX (US); Tom Weatherford, Magnolia, TX (US); Alan Ebert, Houston, TX (US)

(73) Assignee: Flowchem, Ltd., Waller, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,367

(22) Filed: Aug. 22, 2014

(65) Prior Publication Data

US 2014/0360588 A1    Dec. 11, 2014

Related U.S. Application Data

(63) Continuation-in-part of application No. 13/791,093, filed on Mar. 8, 2013.

(60) Provisional application No. 61/755,190, filed on Jan. 22, 2013.

(51) Int. Cl.
| | | |
|---|---|---|
| *B05D 5/08* | (2006.01) |
| *C10M 169/04* | (2006.01) |
| *C08L 23/24* | (2006.01) |
| *F17D 1/17* | (2006.01) |
| *C10M 111/02* | (2006.01) |
| *C10L 1/10* | (2006.01) |
| *C10L 1/16* | (2006.01) |
| *C10L 1/12* | (2006.01) |
| *C10L 1/188* | (2006.01) |
| *C10L 1/19* | (2006.01) |
| *C10L 1/224* | (2006.01) |

(52) U.S. Cl.
CPC ............ *C10M 169/04* (2013.01); *C08L 23/24* (2013.01); *C10L 1/10* (2013.01); *C10M 111/02* (2013.01); *C10M 169/041* (2013.01); *F17D 1/17* (2013.01); *C10L 1/125* (2013.01); *C10L 1/1641* (2013.01); *C10L 1/1881* (2013.01); *C10L 1/191* (2013.01); *C10L 1/224* (2013.01); *C10L 2200/0213* (2013.01); *C10L 2230/14* (2013.01); *C10L 2290/141* (2013.01); *C10M 2201/02* (2013.01); *C10M 2205/022* (2013.01); *C10M 2205/024* (2013.01); *C10M 2205/026* (2013.01); *C10M 2205/028* (2013.01); *C10M 2205/0225* (2013.01); *C10M 2205/0245* (2013.01); *C10M 2205/0265* (2013.01); *C10M 2205/0285* (2013.01); *C10M 2207/2895* (2013.01); *C10N 2220/082* (2013.01); *C10N 2220/084* (2013.01); *C10N 2230/06* (2013.01); *C10N 2250/12* (2013.01); *Y10T 137/0391* (2015.04)

(58) Field of Classification Search
CPC .......................................................... F17D 1/17
USPC .......................................................... 523/175
See application file for complete search history.

(56) References Cited

U.S. PATENT DOCUMENTS

| | | |
|---|---|---|
| 2,554,846 A | 5/1951 | Turinsky |
| 4,289,679 A | 9/1981 | Mack |
| 4,358,572 A | 11/1982 | Mack et al. |
| 4,415,704 A | 11/1983 | Weinstein |
| 4,433,123 A | 2/1984 | Mack |
| 4,493,904 A | 1/1985 | Mack |
| 4,789,383 A | 12/1988 | O'Mara et al. |
| 4,826,728 A | 5/1989 | O'Mara et al. |
| 4,837,249 A | 6/1989 | O'Mara et al. |
| 5,539,044 A | 7/1996 | Dindi et al. |
| 6,172,151 B1 | 1/2001 | Johnston et al. |
| 6,894,088 B2 | 5/2005 | Motier et al. |
| 6,946,500 B2 | 9/2005 | Harris et al. |
| 7,271,205 B2 | 9/2007 | Mathew et al. |
| 2006/0276566 A1 | 12/2006 | Mathe et al. |
| 2008/0287331 A1 | 11/2008 | Lin et al. |
| 2012/0123019 A1 | 5/2012 | Johnston et al. |

FOREIGN PATENT DOCUMENTS

| | | |
|---|---|---|
| GB | 1410722 | 10/1975 |
| WO | WO 2009/151576 | 12/2009 |

OTHER PUBLICATIONS

U.S. Appl. No. 13/791,093, filed Mar. 8, 2013.*

* cited by examiner

*Primary Examiner* — Edward Cain
(74) *Attorney, Agent, or Firm* — Bushman Werner, P.C.

(57) ABSTRACT

A drag reducing composition for use in hydrocarbon streams which contains a finely divided, solid polyolefin friction reducing agent, a suspending medium comprised of water and a liquid organic carrier containing from 10 to 14 carbon atoms and having at least one hydroxyl group and a partitioning agent comprising a compound having a hydrophobic group and a hydrophilic group and exhibiting at least some surface activity.

7 Claims, No Drawings

DRAG REDUCING COMPOSITIONS AND METHODS OF MANUFACTURE AND USE

CROSS REFERENCE TO RELATED APPLICATION

This application is a continuation-in-part of U.S. application Ser. No. 13/791,093, filed Mar. 8, 2013, which claims priority to U.S. Application No. 61/755,190 filed on Jan. 22, 2013, the disclosures of which are incorporated herein by reference for all purposes.

FIELD OF THE INVENTION

The present invention relates to compositions for reducing friction in the flow of hydrocarbons such as crude oil or refined products in conduits such as pipelines, and to methods for producing and using such compositions.

BACKGROUND OF THE INVENTION

The prior art abounds with patents directed to generally non-crystalline, high molecular weight polyolefin, particularly polyalphaolefins, compositions which are generally hydrocarbon soluble and, when dissolved in a hydrocarbon fluid flowing through a conduit, greatly reduce turbulent flow and decrease "drag." This reduction of drag is important since it reduces the amount of horsepower needed to move a given volume of hydrocarbon, or conversely enables greater volumes of fluid to be moved with a given amount of power. These polyolefin drag reducers display flow enhancing characteristics not present in commonly known crystalline, largely non-hydrocarbon soluble polymers such as polyethylene and polypropylene.

It is known that these polyalphaolefin drag reducers are susceptible to degradation by shear when dissolved in the flowing hydrocarbon in the conduit. Accordingly, pumps, constrictions in the conduit, or the like which result in excessive turbulent flow lead to degradation of the polymer thereby decreasing its effectiveness. Thus, it is necessary that the drag reducing compositions be introduced into the flowing hydrocarbon stream in a form which achieves certain desirable features.

First of all, the drag reducing compositions should be in a form that is easy to transport and handle without special equipment since injection points for the drag reducing compositions into the flowing hydrocarbon stream are often at remote and inaccessible locations. Secondly, the polymer must be in a form which dissolves rapidly in the hydrocarbon stream flowing in the conduit since the polyalphaolefins have little drag reducing effect until solubilized in the hydrocarbon stream. Lastly, the drag reducing composition should impart no deleterious effects to the hydrocarbon. For example, in the case of crude oil flowing through a pipeline, certain amounts of material and contaminants can be tolerated unlike in finished pipeline products such as diesel fuel, gasoline and other hydrocarbon materials resulting from refining operations.

SUMMARY OF THE INVENTION

In one aspect, the present invention provides drag reducing compositions which minimize agglomeration and heat stability problems.

In another aspect, the present invention provides a drag reducing composition containing polyolefin, water a liquid carrier and a partitioning agent carrier.

In still another aspect, the present invention provides a method of reducing drag in a conduit conveying a liquid hydrocarbon comprising introducing into the conduit an effective amount of a drag reducing composition described above.

These and further features and advantages of the present invention will become apparent from the following detailed description, wherein reference is made to the figures in the accompanying drawings.

DETAILED DESCRIPTION OF PREFERRED EMBODIMENTS

Polymers which are used to prepare the finely divided polymer particles used in the drag reducing compositions of the present invention are obtained by polymerizing or copolymerizing mono-olefins containing from about 2 to about 30 carbon atoms. More usually, the mono-olefins, which are preferably alpha olefins, used in the preparation of the friction-reducing polymers used in the drag reducing compositions of the present invention contain from about 4 to about 20 carbon atoms, most preferably from about 6 to about 14 carbon atoms.

Any of several well known methods for polymerizing the mono-olefins may be employed to produce the polymeric/copolymeric friction-reducing agents used in the drag reducing compositions of the present invention. A particularly suitable method is the Ziegler-Natta process which employs a catalyst system comprising the combination of a compound of a metal of Groups IVb, Vb, VIb, or VIII of the Periodic Table of Elements, with an organo metal compound of a rare earth metal or a metal from Groups Ia, IIa, and IIIb of the Periodic Table of Elements. Particularly suitable catalyst systems are those comprising titanium halides and organo aluminum compounds. A typical polymerization procedure is to contact the monomeric mixture with a catalyst in a suitable inert hydrocarbon solvent for the monomers and the catalyst in a closed reaction vessel at reduced temperatures autogenous pressure and in a nitrogen or inert atmosphere. Methods and catalysts used in the preparation of polyolefin drag-reducing polymers useful in the present invention are disclosed in the following U.S. Pat. Nos. 4,289,679; 4,358,572; 4,415,704; 4,433,123; 4,493,903; and 4,493,904, all of which are incorporated herein by reference for all purposes. Polyalphaolefins used in the drag reducing compositions of the present invention can be produced by a so-called solution polymerization technique, or by bulk polymerization methods as described, for example, in U.S. Pat. No. 5,539,044, the disclosure of which is incorporated herein by reference for all purposes.

The polymers which are used in preparing the drag reducing compositions of the present invention are generally those of high molecular weight, the only limitation on the molecular weight being that it must be sufficient to provide effective drag reduction in the flowing stream of hydrocarbon in a conduit. In general, the effectiveness of the polymer composition to reduce drag increases as the molecular weight increases. On the upper end of the scale, the molecular weight of the polymers used in the process of the invention is limited only by the practicability of making the polymers. The average molecular weight of the desirable polymers is usually over 100,000 and is generally in the range of from about 100,000 to about 30 million. The average molecular weight of the polymers used in the processes and compositions of the present invention is preferably in the range of about 10 to about 25 million. In general, useful polyolefins in the present invention can be characterized as ultra-high molecular weight non-crystalline polymers.

Generally speaking, the drag reducing compositions of the present invention will contain from about 15 to 45%, preferably 20 to 35% by weight of the polyolefin produced as described above, be it a solution or bulk polymerized polymer. Unless otherwise specified, all percentages herein are by weight and refer to the weight of the drag reducing compositions.

In addition to the polyolefin drag reducing agent the compositions of the present invention comprise a suspending medium in which the polymeric drag reducer is insoluble. In general, the suspending medium comprises from about 2 to about 25%, preferably from about 5 to about 20% water and from about 40 to about 95%, preferably from about 40 to about 75%, more preferably from about 50 to about 70%, of a $C_{10}$-$C_{14}$ liquid carrier which has at least one hydroxyl group and at least one other functional group containing at least one of oxygen or nitrogen. The liquid carrier will have a melting point of at least about −20° C. or lower and a flash point of at least about 140° F. or higher. A characteristic of the carriers used in the suspending mediums of the present invention is the fact that they exhibit low "miscibility" with water e.g., less than about 5%, at 25° C. in the process of forming a single liquid phase. Additionally, the carriers have a relatively high hydrocarbon content. As is well known to those skilled in the art, any drag reducing composition which comprises a carrier, suspending medium or the like must employ liquids which do not dissolve the drag reducing polymer which would render them totally ineffective as drag reducers in flowing hydrocarbon streams. It is thus surprising that the carriers used in the composition of the present invention despite having a relatively high hydrocarbon content do not, to any significant extent, dissolve the drag reducing polymer.

The carriers used in the suspending mediums of the present invention offer several distinct advantages. For one they are liquid at room temperature and remain liquid at temperatures at least as low as about −20° F. Further, the fact that the carriers do not dissolve the drag reducing polymer even at elevated temperatures e.g., 120 to 160° F., means that the drag reducers can be used in ambient environments where temperatures can reach 120° F. and higher. In this regard it is well known that in pipelines in the Middle East temperatures can easily rise to 120-130° F. and in some cases even higher. Thus even though the carriers of the present invention contain a substantial hydrocarbon content, surprisingly they do not dissolve the drag reducing polymer to any extent even at temperatures of 120-130° F. These characteristics of the carrier render the drag reducing compositions of the present invention virtually universal in that they can be used in extremes of temperature i.e., Arctic cold to Middle East heat. A preferred carrier in accordance with the present invention comprises 2,2,-4, trimethyl-1,3-pentanediol monoisobutyrate marketed under the name Texanol.

In addition to the polyolefin friction reducing agent and the suspending medium, the drag reducing compositions of the present invention contain a partitioning agent, In general, the partitioning agents of the present invention will comprise a compound having a hydrophobic group and a hydrophilic group. Thus, the partitioning agent will exhibit at least some surface activity. Without wanting to be bound by any particular theory, it is believed that the surface active properties of the partitioning agents of the present invention, in some manner, increases the miscibility of the carrier in water to greater than 5% by wt at 25° C. in the sense that there is only a single liquid phase. This is an important feature of the partitioning agents of the present invention since the carriers of the present invention are generally immiscible with water at 25° C. e.g., they exhibit a miscibility of less than about 5% at 25° C.

However, according to the present invention it has been found that if the miscibility between the water and the carrier can be increased to greater than 5% and more particularly greater than 7% especially from about 8 to about 12% by weight, wherein the percentages in referring to the water and carrier refer to their relative amounts in the suspending medium, the drag reducing agent exhibits enhanced stability and nonagglomeration. A preferred class of suitable partitioning agents include amides of the formula:

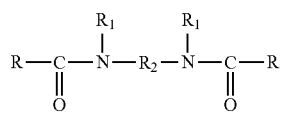

in which
R represents $C_{10}$-$C_{22}$-alkyl or -alkenyl,
$R_1$ represents H or $C_1$-$C_4$-alkyl, or the two $R_1$'s together represent a 1,2-ethylene bridge and
$R_2$ represents

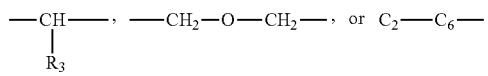

alkylene, and
$R_3$ represents H, $C_1$-$C_6$-alkyl or phenyl,

Examples of the amides of the formula (I) which may be mentioned are: methylene-bis-lauric acid amide, methylene-bis-myristic acid amide, methyl-bis-palmitic acid amide, methylene-bis-stearic acid amide, methylene-bis-eicosanoic acid amide, methylene-bis-behenic acid amide, methylene-bis-oleic acid amide, 1,2-ethylene-bis-lauric acid amide, 1,2-ethylene-bis-palmitic acid amide, 1,2-ethylene-bis-stearic acid amide, 1,4-butylene-bis-stearic acid amide, isobutylene-bis-stearic acid amide, benzylidene-bis-stearic acid amide, methylene-bis-linoleic acid amide, bis-palmitoylaminomethyl ether, bis-stearoylaminomethyl ether, 1,3-bis-lauroylimidazolidine or 1,3-bis-stearylimidazolidine.

Preferred compositions contain ethylene-bis-stearic acid amide, ethylene-bis-eicosanoic acid amide or ethylene-bis-behenic acid amide, but in particular ethylene-bis-stearic acid amide. The compounds are largely known and can be prepared by known methods, as described, for example in British Pat. No. 1,410,722 or in U.S. Pat. No. 2,554,846.

Another group of useful but less preferred partitioning agent include metallic salts of fatty acids such as potassium stearate, calcium stearate, magnesium stearate, etc.

A characteristic of the partitioning agents of the present invention, other than their theorized ability to increase the miscibility of the carrier and water, is their function, be it chemical or physical, of preventing the finely divided polymeric drag reducing agents from agglomerating to the extent that they form a solid or substantially solid non-dispersible mass.

In general, the partitioning agents of the present invention will be present in the composition in an amount of from about 3 to about 6% by weight based on the weight of the composition.

The composition of the present invention can also include, with advantage, rheology modifier and/or thickening agents, non-limiting examples of which may include guar gum, guar gum derivatives, hydroxyl methyl cellulose, xanthan gums, polyacrylamides, hydroxyl propyl cellulose, modified starches, and polysaccharides. When employed, the thickening agents will generally be present in an amount of from about 0.01 to about 1.0 wt %, preferably from about 0.25 to about 0.5 wt %.

The compositions of the present invention can also include with advantage, a biocide in an amount of from about 0.01 to about 0.5 wt %, preferably from about 0.05 to about 0.3 wt %. Non-limiting examples of typical biocides include: glutaraldehyde, a glutaraldehyde/quaternary ammonium compound blend, isothiazolin, tetrakishydromethyl phosphonium sulfate (THPS), 2,2-dibromo-3-nitrilopropionamide, bronopol and mixtures thereof.

In one method of preparing the compositions of the present invention, the drag reducing polymeric agent is ground at cryogenic temperatures to produce finely divided free flowing particulate polyolefin material. The term "cryogenic temperatures" means temperatures below the glass transition temperature of the polymer or copolymers which are being subjected to grinding. For example, when the polyolefin friction-reducing agent is a high molecular weight polymer (1-decene), the cryogenic temperature is below about −60° C. The temperature employed in carrying out the grinding operation can vary depending on the glass transition point of the particular polymer or polymers used. However, such temperatures must be below the lowest glass transition point of the polymer. Any commercial grinders which are capable of producing finely subdivided particles from solids may be used in producing the free flowing, particulate polyolefin material. Examples of suitable grinders include impact mills, rod mills, ball mills, and the like. The particle size of the resulting particulate polyolefin material can be controlled by methods well known in the art such as by varying the grinding speed, controlling the time of grinding, employing a grinding aid, etc. Techniques for cryogrinding drag reducing particulate polyolefins are disclosed in U.S. Pat. Nos. 4,837,249; 4,826,728; and 4,789,383, all of which are incorporated herein by reference for all purposes.

Generally speaking the cryoground grinding is conducted in the presence of the partitioning agent and in this regard the present invention contemplates that at least a part of the partitioning agent may be added as part of the cryogrinding step. Alternatively, the polymer can be cryoground in the absence of any partitioning agent and the partitioning agent and the cryoground polymer added separately to the suspending medium. Thus, for example, cryoground polyalpha olefin friction reducing agent could be added directly to the suspending medium together with the partitioning agent. Indeed, it has been found that a stable non-agglomerating composition can be achieved in this manner. However, in the usual case, the cryogrinding of the poly alpha olefin will occur in the presence of at least a portion of the partitioning agent, the remainder of the partitioning agent, being added to the suspending medium together with the cryoground poly alpha olefin.

Other methods of grinding or forming particulate drag reducing polymer are disclosed in U.S. Pat. Nos. 6,894,088; 6,946,500; 7,271,205; and U.S. Publication 2006/0276566, the disclosures of which are incorporated herein by reference for all purposes.

The compositions of the present invention can also include emulsifiers although typically emulsifiers are not necessary.

The stable, non-agglomerating compositions of the present invention flow easily and can be readily injected into a pipeline or conduit containing flowing hydrocarbons without any special equipment. Generally, the drag reducing compositions of the present invention can be added to the flowing hydrocarbon fluid by continuous injection by means of proportioning pumps situated at desired locations along the conduit in which the hydrocarbon is flowing.

The hydrocarbon fluids in which friction loss may be reduced by addition of the drag reducing compositions of the present invention include such materials as crude oils, gas oils, diesel oils, fuel oils, refined liquid hydrocarbon stream, asphaltic oils, and the like, varying from materials with relatively low viscosity, pure materials to high viscosity hydrocarbon containing fractions.

The amount of polyolefin friction-reducing agent used for reducing drag in a pipeline or conduit is usually expressed as ppm (parts by volume of polymer per million parts by weight of hydrocarbon fluid). The amount of a polyolefin friction reducing agent required to product the desired drag reduction will vary depending upon the physical properties and composition of the hydrocarbon fluid. Thus, the desired result may be obtained by the addition of as little as two ppm or less of the polymer. Conversely, some high viscosity fluids may require as much as 1,000 ppm or even up to 10,000 ppm of the polyolefin friction reducing agent to achieve desired drag reduction. Generally, it is preferred to add the drag reducing composition of the present invention in amounts of from about 2 to about 500 ppm and most preferably amounts from about 1 to about 100 ppm.

Non-limiting examples of drag reducing formulations according to the present invention are given below. Unless otherwise specified all percentages are by weight. (Need examples of various formulations)

Example 1

A drag reducing formulation was prepared containing, by weight, 6.9% water, 62.4% Texanol, 25.2% polymer and 5.5% ethylene-bis-stearic acid amide.

Example 2

A drag reducing formula was prepared containing, by weight, 13.9% water, 55.4% Texanol, 25.2% polymer and 5.5% ethylene-bis-stearic acid amide.

It was found that the formulations thus prepared showed no appreciable agglomeration or separation of the polymer particles after 180 days. The formulations exhibited excellent drag reduction properties and stability which was determined visually. The formulations, tested at 160° F., showed no discernible dissolution of the polymer drag reducer. Finally, the formulations also exhibit a pour point between −44° F. and −49° F.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:
1. A drag reducing composition comprising:
  from about 15 to about 45% by weight of said compositions of a finely divided, solid polyolefin friction reducing agent formed from mono-olefins containing from 2 to 30 carbon atoms;
  a suspending medium comprising:

water in an amount of from about 2 to about 25% by wt. of said suspending medium; and a carrier in an amount of from about 40 to about 75% by wt. of said suspending medium, said carrier comprising an organic liquid having from 10 to 14 carbon atoms, having at least one hydroxyl group and at least one other functional group containing one of oxygen or nitrogen, said carrier having a melting point of at least about −20° C. or lower and a flash point of at least about 140° C. or higher, said carrier being miscible with water in an amount of less than about 5% by wt. at 25° C.; and from about 3 to about 6% by weight of said composition of a partitioning agent comprising a compound having a hydrophobic group and a hydrophilic group, said partitioning agent being surface active and effective to increase the miscibility of said carrier in said water to greater than 5% by wt. at 25° C.

2. The composition of claim 1 wherein said polyolefin friction reducing agent is produced by bulk polymerization.

3. The composition of claim 1 wherein said partitioning agent is selected from the group consisting of amides of the formula:

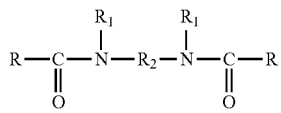

I in which

R represents $C_{10}$-$C_{22}$-alkyl or -alkenyl, $R_1$ represents H or $C_1$-$C_4$-alkyl, or the two $R_1$'s together represent a 1,2-ethylene bridge and $R_2$ represents

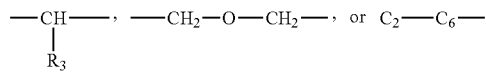

alkylene, and $R_3$ represents H, $C_1$-$C_6$-alkyl or phenyl; metallic salts of fatty acids; and mixtures thereof.

4. The composition of claim 3 wherein the partitioning agent comprises ethylene-bis-stearic acid amide.

5. The composition of claim 3 wherein the partitioning agent comprises calcium stearate.

6. A method of reducing drag in a flowing hydrocarbon stream comprising:

introducing into said hydrocarbon stream an effective amount of a drag reducing composition according to claim 1.

7. The method of claim 6 where said drag reducing composition is added to said hydrocarbon stream in an amount to provide from about 2 to about 500 parts of drag reducing polymer per million parts by volume of hydrocarbon fluid in said hydrocarbon stream.

* * * * *